US010288212B1

(12) United States Patent
Bhattacharya

(10) Patent No.: US 10,288,212 B1
(45) Date of Patent: May 14, 2019

(54) TUNABLE SUPPORT FRAME STRUCTURE FOR ROTATING MACHINES

(71) Applicant: Mantosh Isanchandra Bhattacharya, Patna (IN)

(72) Inventor: Mantosh Isanchandra Bhattacharya, Patna (IN)

( * ) Notice: Subject to any disclaimer, the term of this patent is extended or adjusted under 35 U.S.C. 154(b) by 0 days.

(21) Appl. No.: 15/986,692

(22) Filed: May 22, 2018

(30) Foreign Application Priority Data

Feb. 19, 2018 (IN) .............................. 201831006280

(51) Int. Cl.
F16M 5/00 (2006.01)
F16M 7/00 (2006.01)
(52) U.S. Cl.
CPC ................ F16M 5/00 (2013.01); F16M 7/00 (2013.01)
(58) Field of Classification Search
CPC .................................. F16M 5/00; F16M 7/00
USPC ....... 248/637, 638, 644, 649, 659, 660, 671, 248/678, 680
See application file for complete search history.

(56) References Cited

U.S. PATENT DOCUMENTS

| 1,275,122 | A | * | 8/1918 | Bordeleau | F16M 7/00 248/657 |
| 1,810,506 | A | * | 6/1931 | Turner | F16M 5/00 248/639 |
| 2,828,931 | A | * | 4/1958 | Harvey | B65D 19/0095 108/54.1 |
| 5,085,396 | A | * | 2/1992 | Mansson | B65D 85/68 248/676 |
| 6,981,685 | B1 | * | 1/2006 | McHugh | F16M 5/00 248/188.1 |
| 7,028,970 | B1 | * | 4/2006 | Wiseman | F16M 5/00 108/51.11 |
| 7,976,266 | B2 | * | 7/2011 | Brown | F02C 7/20 248/157 |
| 9,752,505 | B2 | * | 9/2017 | Roh | F01D 25/28 |
| 2001/0036399 | A1 | * | 11/2001 | Notohardjono | H02B 1/301 414/800 |
| 2007/0131839 | A1 | * | 6/2007 | Dunn | B63H 21/16 248/637 |
| 2010/0162726 | A1 | * | 7/2010 | Robertson | F01D 25/285 60/797 |

(Continued)

FOREIGN PATENT DOCUMENTS

WO WO-2017096476 A1 * 6/2017 ........... E21B 15/006

*Primary Examiner* — Muhammad Ijaz
(74) *Attorney, Agent, or Firm* — Zilka-Kotab, P.C.

(57) ABSTRACT

The present disclosure relates to a mounting assembly for supporting a machine. The mounting assembly comprises a support frame structure including a plurality of traverse members spaced apart from each other, each traverse member extending from a first longitudinal section to a second longitudinal section of the support frame structure, wherein each longitudinal sections and comprises a plurality of holes and respectively, and an attachment mechanism to increase effective stiffness of the support frame structure, the attachment mechanism comprising any or a combination of a plurality of attachments and a turnbuckle attachment to increase directional stiffness of the support frame structure, wherein the attachment mechanism arrests any or a combination of rolling mode of motion and pitching mode of motion of the support frame structure and the machine by increasing the effective stiffness of the support frame structure.

9 Claims, 7 Drawing Sheets

(56) References Cited

U.S. PATENT DOCUMENTS

2011/0236129 A1* 9/2011 Guntert, Jr. ............. E01C 19/42
 404/72
2018/0363834 A1* 12/2018 Clarke ................... F16M 7/00

* cited by examiner

SECTION A-A

SECTION B-B

TUNABLE SUPPORT FRAME STRUCTURE FOR ROTATING MACHINES

TECHNICAL FIELD

The present invention relates generally to mounting assemblies of machineries, and more particularly to a mounting assembly for supporting a rotating machine to prevent rigid body modes, particularly rotational rigid body modes of the machine.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Many rotating machines, such as motors, pumps, fans and the like, are connected to suitable ground supports via mounting assemblies. Such mounting assemblies are intended to absorb vibrations, but must also be capable of supporting weight of the machines and its dynamic forces during operation without getting excited at operating/forcing frequencies thereof (for example, due to variations in motor speed, load torque reaction, etc.). Design of such mounting assemblies is largely dependent upon nature and types of forces transmitted between the machine and the foundation.

Currently used investigation techniques for determining possibility of structural resonance of the mounting assembly excited by forcing operating frequency of a rotating machine are lengthy and intricate processes, and utilize analytical techniques such as bump test, finite element analysis, experimental modal analysis, operational deflection shape analysis, mode shapes plotting, etc. Such investigation techniques take a considerable amount of time particularly if the machines are installed at a remote location. Special tools such as, multi-channel vibration analyzer, instrumented hammer, etc., are also required to detect resonance and affected rigid body modes of support frame structures of the machines.

Once the affected rigid body modes, particularly rotational rigid body modes along x-axis and y-axis of the support frame structure and influencing operating frequencies of the machines are determined, modeling of the rigid body modes of the support frame structure using Finite Element based tools, simulation/modal testing of a structural modification of the mounting assembly is done to shift the resonant frequency of the mounting assembly away from the forcing frequency, and thereafter, modification of the mounting assembly is done by adding structural elements on the mounting assembly. Also, in order to alter structural modifications of conventional support frame structures, the machine and the support frame structure need to be dismantled and removed from their foundation.

There is therefore a need in the art to provide a mounting assembly for supporting a rotating machine to effectively prevent rigid body modes of the machine, particularly rotational motion along x-axis and x-axis. Further, there exists a need to provide for techniques to increase stiffness of the mounting assembly in a specific direction in order to prevent rotational modes of motion of the machine while the machine is installed on a foundation/structure at a site.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

It is an object of the present disclosure to provide a mounting assembly to support weight of a machine.

It is another object of the present disclosure to provide a mounting assembly to prevent free rotation and translation of the machine.

It is another object of the present disclosure to provide a mounting assembly to transfer static and dynamic loads of the machine to a ground support.

It is yet another object of the present disclosure to provide a mounting assembly with increased stiffness in a specific direction to prevent rigid body modes of the machine.

It is still another object of the present disclosure to provide enhance directional stiffness of the mounting assembly without removing the machine and the mounting assembly from a foundation.

SUMMARY

The present disclosure pertains to a mounting assembly for supporting a rotating machine to prevent rigid body modes of the machine, particularly rotational motion along x-axis and y-axis. Aspects of the present disclosure provide a mounting assembly to support a machine, the mounting assembly including a support frame structure including a plurality of traverse members spaced apart from each other, each traverse member extending from a first longitudinal section of the support frame structure to a second longitudinal section of the support frame structure, wherein each of the first longitudinal section and the second longitudinal section includes a plurality of holes, each hole located between two consecutive traverse members of the plurality of traverse members, and an attachment mechanism to increase effective stiffness of the support frame structure, the attachment mechanism including any or a combination of a plurality of attachments to increase directional stiffness of the support frame structure, wherein each of the plurality of attachments are inserted into a hole of the plurality of holes present on the first longitudinal section and a pretension is provided to each of the plurality of attachments from a hole of the plurality of holes present on the second longitudinal section, and a turnbuckle attachment to increase directional stiffness of the support frame structure, wherein the turnbuckle attachment includes at least two hinge plates coupled to at least one traverse member of the plurality of traverse members, and a turnbuckle connecting each of the two hinge plates to at least one fixing plate fastened to a vertical section of the machine, wherein the attachment mechanism arrests any or a combination of rolling mode of motion and pitching mode of motion of the support frame structure and the machine by increasing the effective stiffness of the support frame structure.

In an embodiment, at least one plate is welded to an inner side of each of the first longitudinal section and the second longitudinal section, and a plurality of gussets are welded to an outer side of each of the first longitudinal section and the second longitudinal section to compensate for buckling of a portion of the first longitudinal section and the second longitudinal section.

In an embodiment, each of the first longitudinal section and the second longitudinal section includes a plurality of threaded holes extending from the outer side of each of the first longitudinal section and the second longitudinal section.

In an embodiment, the attachment mechanism includes at least one additional plate fastened with each of the first longitudinal section and the second longitudinal section through the plurality of threaded holes to increase bending stiffness of the support frame structure.

In an embodiment, diameter of the plurality of holes present on the first longitudinal section is greater than diameter of the plurality of holes present on the second longitudinal section.

In an embodiment, each of the plurality of attachments includes a circular plate coupled with an end of a hollow cylindrical section.

In an embodiment, the pretension is provided at other end of the hollow cylindrical section by a fastener including a stud coupled with a matching nut and a washer.

In an embodiment, torsional stiffness of the hollow cylindrical section is equal to torsional stiffness of the plurality of traverse members.

In an embodiment, a plurality of steel shims are inserted in between the circular plate and the outer side of the first longitudinal section to ensure contact of the circular plate with the outer side of the first longitudinal section.

In an embodiment, the at least one fixing plate fastened to the vertical section of the machine stool is positioned at a height ranging from 0.5 times to 0.7 times height of the machine stool.

In an embodiment, the at least two hinge plates and the at least one fixing plate incorporate a hinge mechanism respectively to impart a specific degree of freedom to the turnbuckle to fix the position to undertake corrective action at site as required.

In an embodiment, the turnbuckle attachment is configured to provide stability and support to an overhung component of the machine.

Those skilled in the art will further appreciate the advantages and superior features of the disclosure together with other important aspects thereof on reading the detailed description that follows in conjunction with the drawings.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
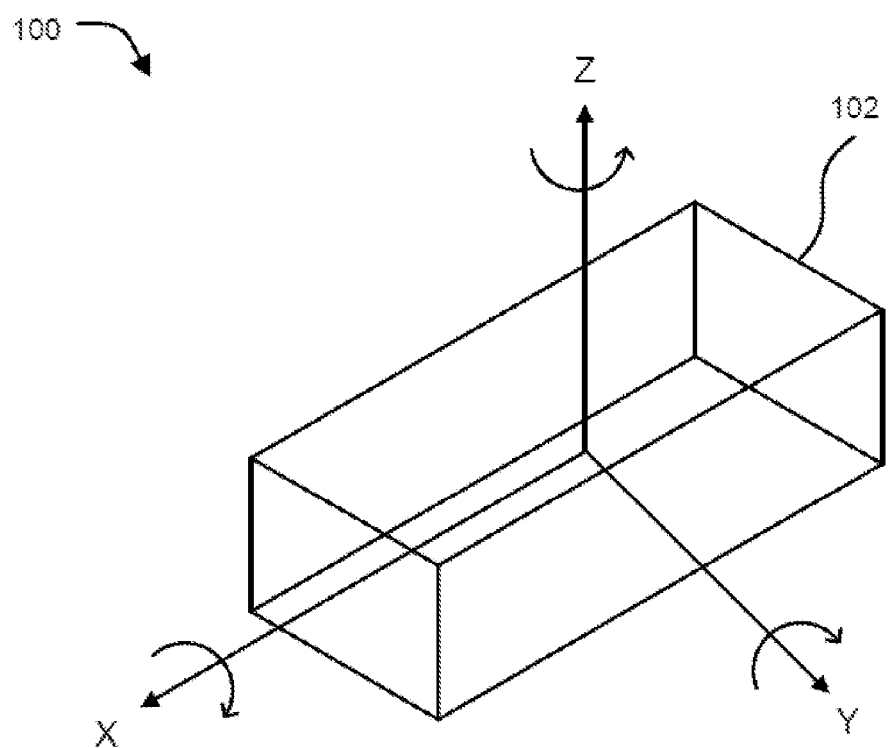
FIG. 1 illustrates representation of rotational rigid body modes of a machine.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

The present disclosure pertains to a mounting assembly for supporting a rotating machine to prevent rigid body modes, i.e., free rotation and translation of the machine, particularly along x-axis and y-axis. Aspects of the present disclosure provide a mounting assembly to support a machine, the mounting assembly including a support frame structure including a plurality of traverse members spaced apart from each other, each traverse member extending from a first longitudinal section of the support frame structure to a second longitudinal section of the support frame structure, wherein each of the first longitudinal section and the second longitudinal section includes a plurality of holes, each hole located between two consecutive traverse members of the plurality of traverse members, and an attachment mechanism to increase effective stiffness of the support frame structure, the attachment mechanism including any or a combination of a plurality of attachments to increase directional stiffness of the support frame structure, wherein each of the plurality of attachments are inserted into a hole of the plurality of holes present on the first longitudinal section and a pretension is provided to each of the plurality of attachments from a hole of the plurality of holes present on the second longitudinal section, and a turnbuckle attachment to increase directional stiffness of the support frame structure, wherein the turnbuckle attachment includes at least two hinge plates coupled to at least one traverse member of the plurality of traverse members, and a turnbuckle connecting each of the two hinge plates to at least one fixing plate fastened to a vertical section of the machine, wherein the attachment mechanism arrests any or a combination of rolling mode of motion and pitching mode of motion of the support frame structure and the machine by increasing the effective stiffness of the support frame structure.

In an embodiment, at least one plate is welded to an inner side of each of the first longitudinal section and the second longitudinal section, and a plurality of gussets are welded to an outer side of each of the first longitudinal section and the second longitudinal section to compensate for possible buckling of a portion of the first longitudinal section and the second longitudinal section where the plurality of holes are created formed.

In an embodiment, each of the first longitudinal section and the second longitudinal section includes a plurality of threaded holes extending from the outer side of each of the first longitudinal section and the second longitudinal section.

In an embodiment, the attachment mechanism includes at least one additional plate fastened with each of the first longitudinal section and the second longitudinal section through the plurality of threaded holes to increase bending stiffness of the support frame structure.

In an embodiment, diameter of the plurality of holes present on the first longitudinal section is greater than diameter of the plurality of holes present on the second longitudinal section.

In an embodiment, each of the plurality of attachments includes a circular plate coupled with an end of a hollow cylindrical section.

In an embodiment, the pretension is provided at other end of the hollow cylindrical section by a fastener including a stud coupled with a matching nut and a washer.

In an embodiment, torsional stiffness of the hollow cylindrical section is equal to torsional stiffness of the plurality of traverse members.

In an embodiment, a plurality of steel shims are inserted in between the circular plate and the outer side of the first longitudinal section to ensure contact of the circular plate with the outer side of the first longitudinal section.

In an embodiment, the at least one fixing plate fastened to the vertical section of the machine stool is positioned at a height ranging from 0.5 times to 0.7 times height of the machine stool.

In an embodiment, the at least two hinge plates and the at least one fixing plate incorporate a hinge mechanism respectively to impart a specific degree of freedom to the turnbuckle for proper fixation.

In an embodiment, the turnbuckle attachment is configured to provide stability and support to an overhung component of the machine.

In an embodiment, the support frame structure can incorporate a stool which can be an integrated part of mounting assembly and can be used to align driven components of the machine such as pump, fan, blower, motor and the likes.

FIG. 1 illustrates rotational rigid body modes (coupled modes) of a machine 102 that is influenced by resonant frequency or low spring stiffness of a support frame structure. In an embodiment, due to variation in the resonant frequency of the support frame structure or in case the support frame structure has low spring coefficient, the machine 102 that is supported by the support frame structure tends to roll, pitch or yaw along x-axis, y-axis and z-axis respectively, as illustrated. In order to prevent such rotational rigid body modes, the spring coefficient of the support frame structure need to be improved such that variation in the resonant frequency of the support frame structure is confined between permissible limits to prevent excessive rotational motion of the machine 102.

In an embodiment, the present disclosure provides a mounting assembly that can prevent rotational rigid body modes of the machine 102, particularly, but not exclusively, along x-axis and y-axis so as to prevent rolling as well as pitching of the machine 102. The proposed mounting assembly incorporates a number of attachments/accessories that can increase directional stiffness of a support frame structure of the mounting assembly in order to arrest rolling and pitching motion of the machine 102.

It would be appreciated that although embodiments of the present disclosure are explained in terms of preventing rolling and pitching motion of the machine, scope of the present disclosure is not limited to the same in any way whatsoever, and any prevention of any other form of motion such as yaw motion of the machine is well within the scope of the present disclosure.

Figure 2A:
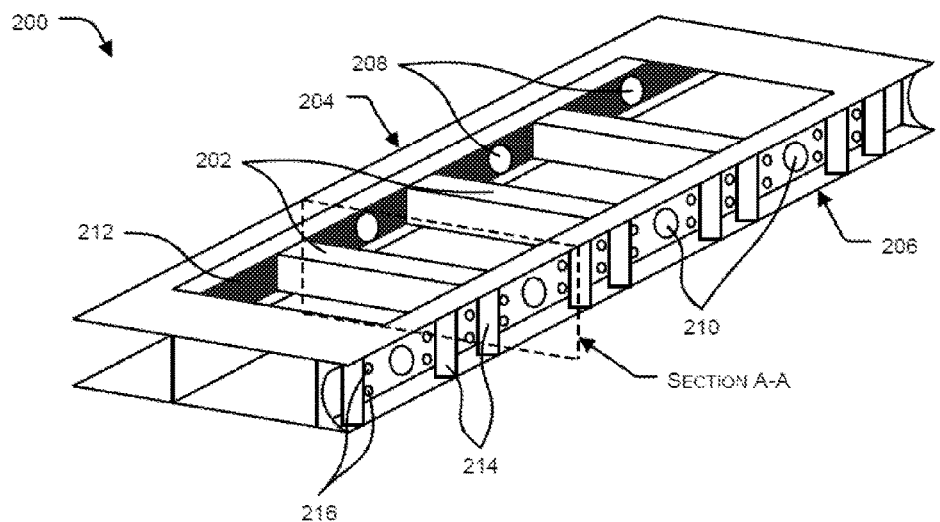
FIG. 2A illustrates an exemplary perspective view representation of a support frame structure of proposed mounting assembly in accordance with an embodiment of the present disclosure.

FIG. 2A illustrates an exemplary perspective view representation of a support frame structure of proposed mounting assembly in accordance with an embodiment of the present disclosure. In an aspect, the proposed mounting assembly can include a support frame structure 200 that can support weight of a machine, such as, a motor, a pump, a fan, a blower and the likes placed over the base fame 200. The support frame structure 200 can prevent rigid body modes of the machine, particularly rotational motion along x-axis and y-axis, by incorporating an attachment mechanism to restrict/arrest rotation as well as translation of the machine, and further to absorb vibrations generated during operation of the machine.

In an aspect, the support frame structure 200 can include a plurality of traverse members 202 attached to longitudinal sections of the support frame structure. The traverse members 202 can extend from a first longitudinal section 204 to a second longitudinal section 206 of the support frame structure 200. The traverse members 202 can be spaced apart from each other by a specific distance such that in between two consecutive traverse members 202, the first longitudinal section 204 can include at least one hole 208, and the second longitudinal section 206 can include at least one hole 210. The holes 208 and 210 can be spaced apart from each other by a specific distance, for example, distance between two consecutive holes 208 can be equal to distance between two consecutive traverse members 202. In an embodiment, diameter of the holes 208 present on the first longitudinal section 204 can be greater than diameter of the holes 210 present on the second longitudinal section 206.

In an embodiment, the support frame structure 200 can also include plates 212 that are joined/coupled with inner sides of the longitudinal sections 204 and 206. Jointing of the plates 212 with the inner sides of the first longitudinal section 204 and the second longitudinal section 206 can be done by any or a combination of fastening, welding and the like metal joining techniques. In an embodiment, the plates 212 shall also include a plurality of holes of same dimension and locations as holes present of the first longitudinal section 204 and the second longitudinal section 206. Diameter of the slots of the plates 212 present on the inner side of the first longitudinal section 206 shall be greater than diameter of the slots of the plates 212 present on the inner side of the second longitudinal section 208.

In an embodiment, a plurality of gussets 214 can be coupled with the support frame structure 200 to provide rigidity and angular stability to the longitudinal sections 204 and 206. The gussets 214 can be coupled with outer sides of the longitudinal sections 204 and 206 via a suitable coupling technique, such as welding and the like metal joining techniques to compensate for buckling of a portion of the first longitudinal section 204 and the second longitudinal section 206. The gussets 214 can be spaced apart from each other by a specific distance so as to enable strengthening of angular dimensions of the longitudinal sections 204 and 206.

Figure 2B:
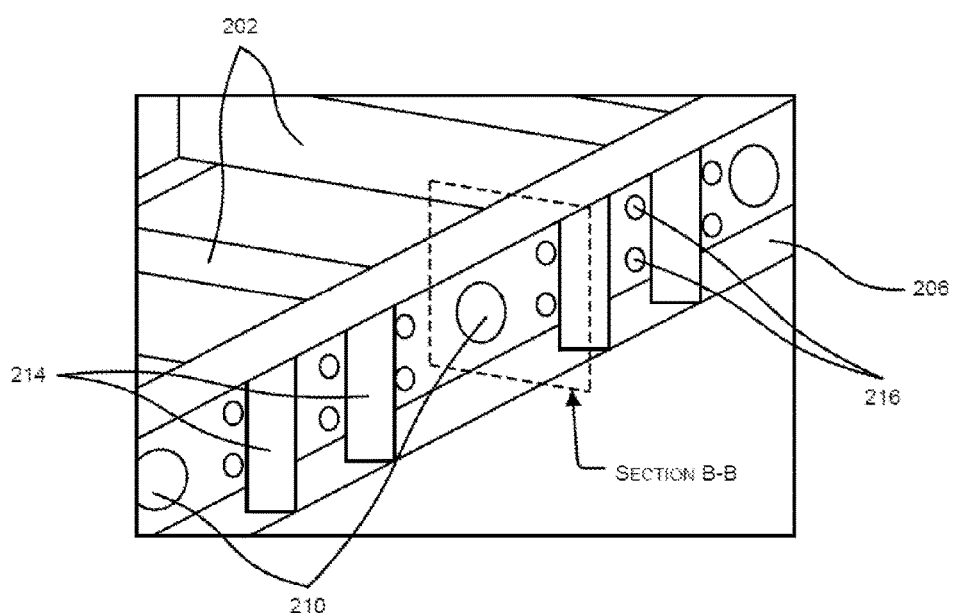
FIG. 2B illustrates an exemplary perspective view representation of outer side of longitudinal sections of the support frame structure in accordance with an embodiment of the present disclosure.
Figure 5:
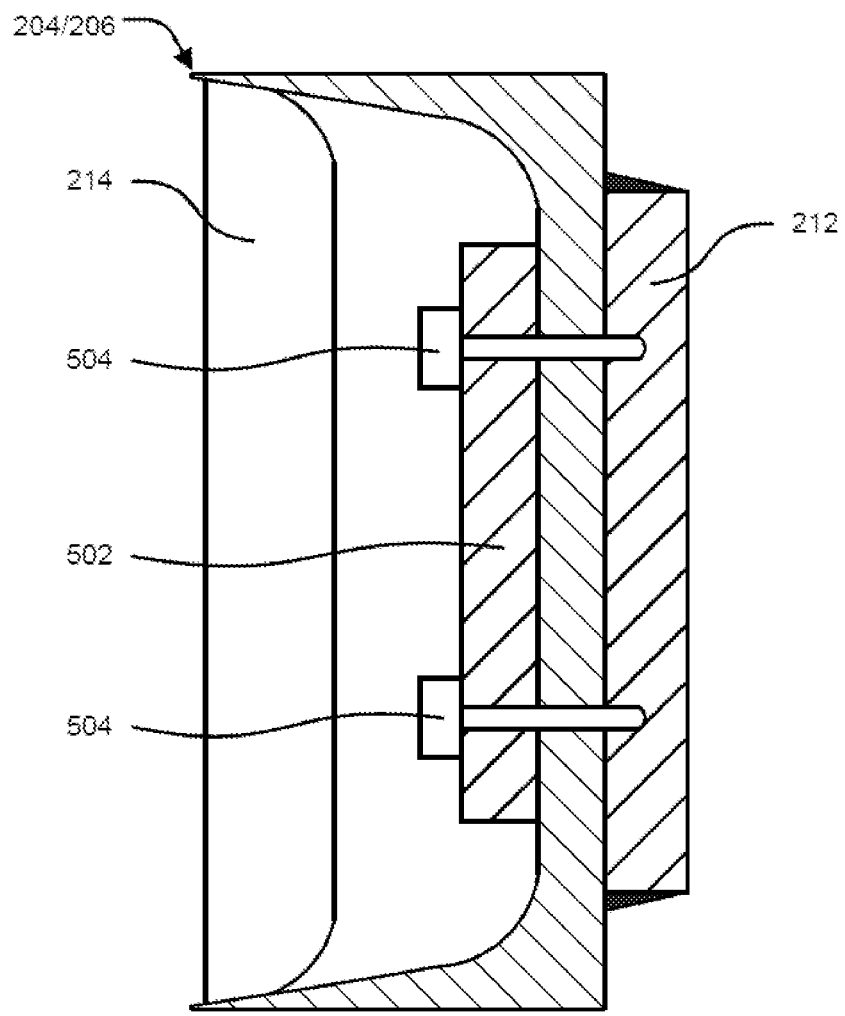
FIG. 5 illustrates an exemplary representation of an additional plate fastened to a longitudinal section of the support frame structure in accordance with an embodiment of the present disclosure.

Referring now to FIG. 2B, the support frame structure 200 can further include a plurality of drilled and tapped fine threaded holes 216 on the outer sides of the first longitudinal section 204 and the second longitudinal section 206 to allow fastening of at least one additional plate 502 (as shown in FIG. 5) to the longitudinal sections 204 and 206 to increase bending stiffness of the support frame structure 200 in order to prevent pitching mode of motion of any or a combination of the support frame structure 200 and the machine. In an embodiment, the threaded holes 216 can extend from the outer sides of the longitudinal sections 204 and 206, at least partially into the plate 212 to provide rigidity to fastening of the additional plate 502.

As illustrated in FIG. 2A, section A-A refers to a cross-section of the support frame structure 200 in which relationship of the holes 208 present on the first longitudinal section 204 and the holes 210 present on the second longitudinal section 206 is shown. As illustrated in FIG. 2B, section B-B refers to a cross-section of the support frame structure 200 in which relationship of the threaded holes 216 present on outer side of the first longitudinal section 204 and the second longitudinal section 206 respectively.

Figure 3A:
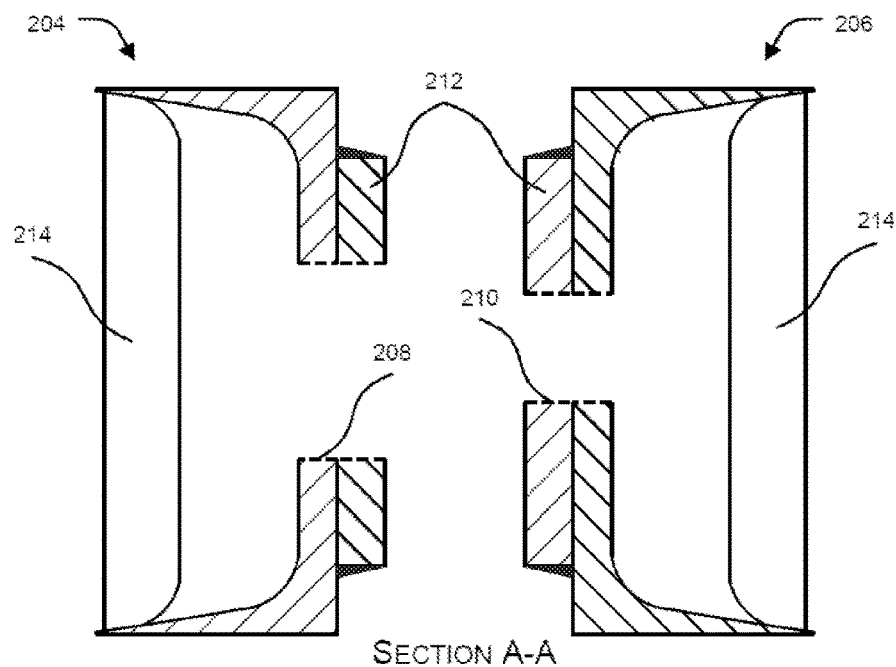
FIGS. 3A and 3B illustrate exemplary sectional views of sections A-A and section B-B of the support frame structure respectively in accordance with an embodiment of the present disclosure.
Figure 3B:
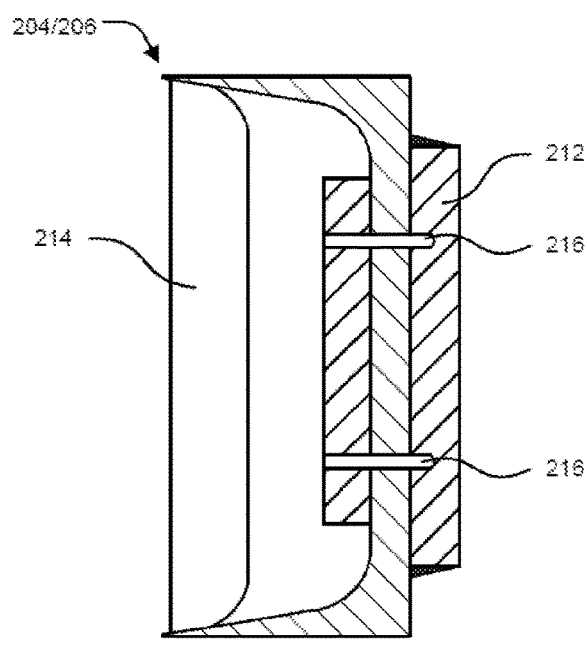

FIGS. 3A and 3B illustrate exemplary sectional views of sections A-A and section B-B of the support frame structure respectively in accordance with an embodiment of the present disclosure. In an embodiment, diameter of the holes 208 present on the first longitudinal section 204 of the support frame structure 200 can be greater than diameter of the holes 210 present on the second longitudinal section 206 of the support frame structure 200 to allow proper pre-tensioning of attachment mechanisms to increase directional stiffness of the support frame structure 200 so as to prevent rolling mode of motion of the support frame structure and the machine. In an embodiment, the holes 208 and 210 can extend through the plates 212 coupled with the respective longitudinal sections 204 and 206 of the support frame structure 200 to allow insertion of the attachment mechanisms through holes 208 and pre-tensioning of the attachment mechanisms through holes 210.

In an embodiment, the threaded holes 216 present on outer sides of the longitudinal sections 204 and 206 can extend at least partially through the plate 212 to allow threaded fasteners, for instance, a threaded bolt with a matching nut made of high tensile material, to pass at least partially into the plate 212 to provide a rigid fastening of the plate 212 with the longitudinal sections 204 and 206. In an embodiment, an additional plate can be fastened to the longitudinal sections 204 and 206 using the threaded fasteners to increase directional stiffness of the support frame structure 200 so as to prevent pitching mode of motion of the support frame structure 200 and the machine.

Figure 4A:
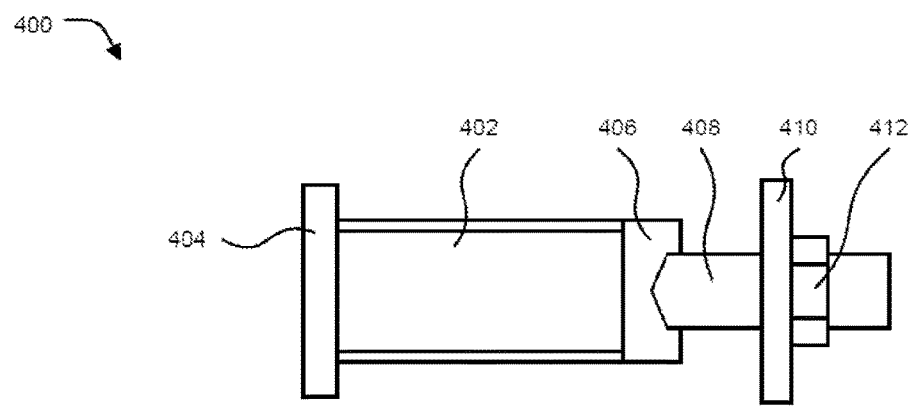
FIGS. 4A and 4B illustrate exemplary representations of an attachment configured between the longitudinal sections of the support frame structure in accordance with an embodiment of the present disclosure.
Figure 4B:
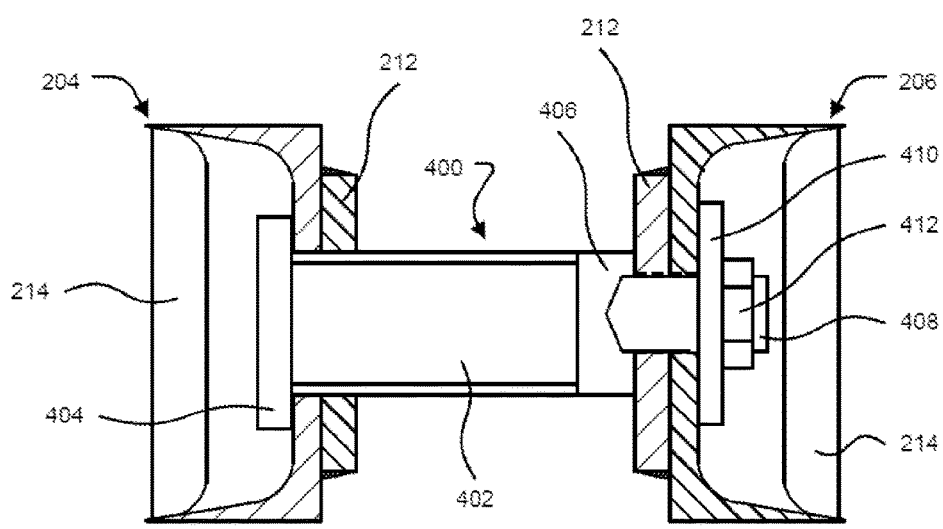

FIGS. 4A and 4B illustrate exemplary representations of an attachment configured between the longitudinal sections of the support frame structure in accordance with an embodiment of the present disclosure. In an aspect, the attachment mechanism can include a plurality of attachments 400 to increase directional stiffness of the support frame structure 200. Each attachment 400 can include a hollow cylindrical section 402 with its one end coupled to a circular plate 404 and other end coupled to a connecting member 406. In an embodiment, coupling of ends of the hollow cylindrical section 402 with the circular plate 404 and the connecting member 406 can be done with the help of suitable metal joining techniques, such as, welding, and the like.

In an embodiment, an attachment 400 can be inserted into a slot 208 of the first longitudinal section 204 such that the circular plate 404 is in contact with the outer side of the first longitudinal section 204, and the connecting member 406 is in contact with the plate 212 coupled with the inner side of the second longitudinal section 206. The attachment 400 can be provided with pretension by a fastener, including, but not limited to, a stud 408 coupled with a thick flat washer 410 and a matching nut 412. The stud 408 can be inserted into a corresponding hole 210 of the second longitudinal section 206 with the washer 410 contacting outer surface of the second longitudinal section 206 ensuring elimination of wear and tear of metallic surfaces of the second longitudinal section 206 and the stud 408. The nut 412 can be tightened so as to ensure a positive locking of the attachment 400. In an embodiment, diameter of the stud 408 can be slightly less than diameter of the hole 210 to ensure proper insertion of the stud into the hole 210 without any wear and tear of metallic surfaces thereof.

It would be appreciated that although pre-tensioning of the attachment is explained in terms of a stud coupled with a washer and a matching nut, scope of the present disclosure is not limited to the same in any way whatsoever, and any other form of fastener such as a nut-bolt fastener, a spring loaded fastener and the likes are well within the scope of the present disclosure.

In an embodiment, a plurality of steel shims can be inserted within a contact region of the circular plate 404 and the outer side of the first longitudinal section 204 to ensure contact of the circular plate 404 with the outer side of the first longitudinal section 204. In another embodiment, the plurality of steel shims can be inserted in between the washer 410 and the nut 412 to prevent slackening of the nut 412 due to force reversals developed as a result of rigid body modes, particularly rotational motion along x and y axis support frame structure of the machine and the support frame structure 200.

In an embodiment, torsional stiffness of the hollow cylindrical section 402 can be equal to torsional stiffness of the plurality of traverse members 202 to effect restraining of rolling mode of motion of any or a combination of the support frame structure 200 and the machine. In an embodiment, diameter of the washer 410 can be greater than diameter of holes 210 to prevent ingress of the washer 410 into the hole 210.

FIG. 5 illustrates an exemplary representation of an additional plate fastened to a longitudinal section of the support frame structure in accordance with an embodiment of the present disclosure. In an aspect, the attachment mechanism can include a plurality of additional plates 502 coupled with outer side of the longitudinal sections 204 and 206 to increase directional bending stiffness of the support frame structure 200. In an embodiment, the additional plates 502 can be slided through a back portion of the gussets 214 and can be coupled with the outer side of the longitudinal sections 204 and 206 with the help of a plurality of threaded fasteners 504 operatively coupled with the plurality of threaded holes 216 of the longitudinal sections 204 and 206. In an embodiment, the threaded holes 216 can extend from the outer sides of the longitudinal sections 204 and 206, at least partially into the plate 212 to provide rigidity to fastening of the additional plate 502 to the longitudinal sections 204 and 206.

Figure 6:
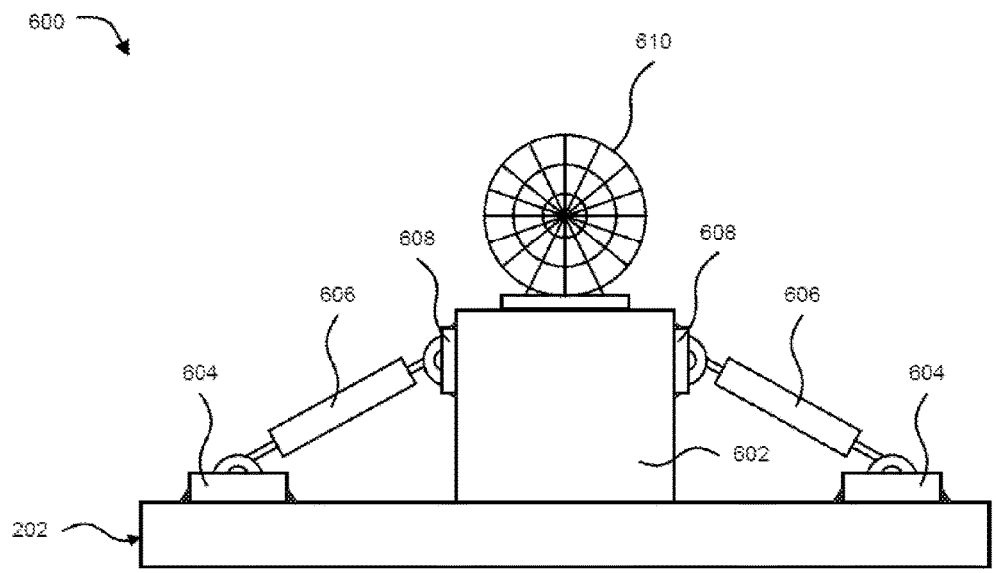
FIG. 6 illustrates an exemplary representation of configuration of a turnbuckle attachment of proposed mounting assembly with a rotating machine in accordance with an embodiment of the present disclosure.

FIG. 6 illustrates an exemplary representation of configuration of a turnbuckle attachment of proposed mounting assembly with a rotating machine 610 in accordance with an embodiment of the present disclosure. In an aspect, when a rotating machine 610 is placed over a stool 602 on the support frame structure 200 of the proposed mounting assembly, rolling as well as pitching mode of motion of the machine 610 and the stool 602 can be arrested by a turnbuckle attachment 600. In an aspect, the turnbuckle attachment 600 can include at least two hinge plates 604 coupled with a traverse member 202. In another embodiment, each of the hinge plates 604 can be coupled with different traverse members 202 to provide support for any overhung component of the stool 602. In an aspect, the turnbuckle attachment 600 can also include at least two turnbuckles 606 configured on each side of the stool 602 to provide rigid support to vertical sections of the machine 610 machine 610. In an embodiment, the turnbuckle attachment 600 is configured to provide stability and support to an overhung component of the stool 602 by incorporating a number of fixing plates 608 coupled to the overhung component of the stool 602 and a number of hinge plates 604 coupled to traverse members 202 of the support frame structure 200, turnbuckles 606 connecting the fixing plates 608 and the fixing plates 604 to enable pre-tensioning with respect to rolling as well as pitching mode of motion of the overhung component of the stool 602 as well as the machine 610.

In an embodiment, the hinge plates 604 can be positioned at each side of the stool 602 to provide support to vertical sections of the stool 602. In an embodiment, the turnbuckles 606 can connect the hinge plates 604 to fixing plates 608 coupled with vertical sections of the stool 602. In an embodiment, the fixing plates 608 can be coupled with the vertical sections of the stool 602 at a height ranging from 0.5 times to 0.7 times height of the machine 610 stool 602. For instance, the fixing plates 608 can be positioned at a height of 0.66 times of the height of the stool 602.

In an embodiment, the hinge plates 604 and the fixing plates 608 can be coupled with the traverse members 202 and the vertical sections of the stool 602 respectively by suitable metal joining techniques, such as, but not limited to, welding, riveting, fastening and the like metal joining techniques. In an embodiment, the hinge plates 604 and the fixing plates 608 can incorporate a hinge mechanism respectively so as to impart a specific degree of freedom to the turnbuckles 606 while fixing the same between the support frame structure 200 and the stool 602.

Figure 7A:
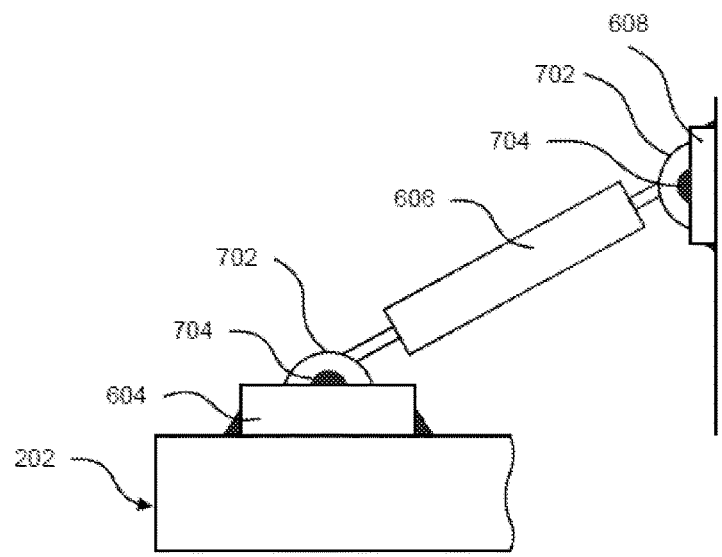
FIGS. 7A and 7B illustrate exemplary representations of various hinge mechanisms of hinge plates of turnbuckle attachment of the proposed mounting assembly in accordance with an embodiment of the present disclosure.
Figure 7B:
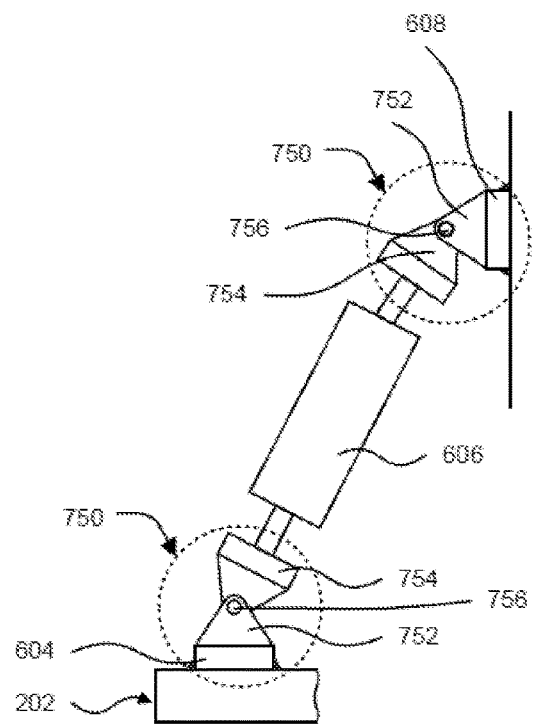

FIGS. 7A and 7B illustrate exemplary representations of various hinge mechanisms of hinge plates of turnbuckle attachment of the proposed mounting assembly in accordance with an embodiment of the present disclosure. In an implementation, one end of a turnbuckle 606 can be coupled with a hinge mechanism 702 of a hinge plate 604 welded to a traverse member 202 of the support frame structure 200 and other end of the turnbuckle 606 can be coupled with a hinge mechanism of a fixing plate 608 welded to a vertical section of the machine stool 602. In an embodiment, the hinge mechanisms of the fixing plates 608 can be the same as the hinge mechanisms 702 of the hinge plates 604. The hinge mechanisms 702 can include cylindrical pin 704 connected at ends of the turnbuckle 602 to effect rotation of the turnbuckle about their respective axis of rotation.

Referring now to FIG. 7B, a hinge mechanism 760 can include two arcuate members 752 and 754 operatively coupled together with the help of a cylindrical pin 756 such that a central axis of the cylindrical pin 756 acts as a pivot point to movement of the arcuate members 752 and 754 with respect to each other. In an embodiment, the cylindrical pins 756 can be made of high tensile steel and high tensile steel alloys.

In an implementation, during operation of the machine, if the machine along with machine stool 602 experiences a rolling mode of motion, the hinge mechanism 702/760 can allow tensioning of the turnbuckle 606 to prevent rolling of the machine and machine stool 602 by increasing directional stiffness of the machine stool 602, thereby preventing rigid body modes, i.e., free rotation of the mounting assembly and the machine stool 602, particularly along x-axis and y-axis.

In an embodiment, the support frame structure 200 can be a pre-fabricated component of the mounting assembly and each of the attachment mechanisms can be pre-fabricated components of the mounting assembly. Configuration of the support frame structure 200 and each of the attachment mechanisms can arrest/prevent any or a combination of rolling mode of motion and pitching mode of motion of the support frame structure 200 and the machine supported over the support frame structure 200. In an embodiment, one assembly of all the pre-fabricated components of the mounting assembly is done, jigs, fixture and the attachment mechanisms can be welded onto the support frame structure 200 to avoid distortion of other components of the mounting assembly and further to prevent undesired movement of the machine mounted over the support frame structure 200.

In an embodiment, the present disclosure provides a mounting assembly to support a rotating machine, such as a motor, a pump, a fan, a blower and the like rotating machines. The support frame structure of the mounting assembly tunable at site and dismantling of the machine from the support frame structure is not required. It would be appreciated by a person skilled in the art that the proposed mounting assembly can avoid time consuming modal analysis and structural work required for detuning of the support frame structure for various machines. In order to effectively detune stiffness of the support frame structure, the machine need is not required to be removed/dismantled from the mounting assembly, and the mounting assembly need not to be removed from a foundation. To analyze rigid body modes of the mounting assembly, particularly along x-axis and y-axis, analyzing techniques such as bump test and operation deflection shape analysis can be carried out with the help of a portable analyzer, thereby making analysis of the rigid body modes of the proposed mounting assembly simple, time-saving and cost-efficient.

In an embodiment, vibrations generated due to operation of the machine and further due to structural resonance of the support frame structure can be brought down to acceptable values by adjusting torque values of various bolt, washers and other fastening members, and modulating thickness of various components such items 400, 502 and 606 as incorporated in the proposed mounting assembly.

Thus, the present disclosure provides a structural support assembly for absorbing dynamic forces and supporting weight of a machine and can be tuned to mitigate structural resonance. The mounting assembly includes a support frame structure support frame structure including a plurality of traverse members spaced apart from each other, each traverse member extending from a first longitudinal section of the support frame structure to a second longitudinal section of the support frame structure, wherein each of the first longitudinal section and the second longitudinal section includes a plurality of holes, each hole located between two consecutive traverse members of the plurality of traverse members, and an attachment mechanism to increase effective stiffness of the support frame structure, the attachment mechanism including any or a combination of a plurality of attachments to increase directional stiffness of the support frame structure, wherein each of the plurality of attachments are inserted into a hole of the plurality of holes present on the first longitudinal section and a pretension is provided to each of the plurality of attachments from a hole of the plurality of holes present on the second longitudinal section, and a turnbuckle attachment to increase directional stiffness of the support frame structure, wherein the turnbuckle attachment includes at least two hinge plates coupled to at least one traverse member of the plurality of traverse members, and a turnbuckle connecting each of the two hinge plates to at least one fixing plate fastened to a vertical section of the machine, wherein the attachment mechanism arrests any or a combination of rolling mode of motion and pitching mode of motion of the support frame structure and the machine by increasing the effective stiffness of the support frame structure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

ADVANTAGES OF EMBODIMENTS OF THE INVENTION

The present disclosure provides a mounting assembly to support weight of a machine.

The present disclosure provides a mounting assembly to transfer static and dynamic loads of the machine to a ground support.

The present disclosure provides a mounting assembly to prevent free rotation and translation of the machine.

The present disclosure provides a mounting assembly with increased stiffness in a specific direction to prevent rigid body modes of the machine.

The present disclosure provides for enhancement of directional stiffness of the mounting assembly without removing the machine and the mounting assembly from a foundation.

The present disclosure provides a mounting assembly that is tunable at site without any hot works to shift natural frequency of the mounting assembly.

The present disclosure provides a mounting assembly along with accessories/attachments that can be used to damp vibrations of machine generated due to resonance of the mounting assembly.

The present disclosure provides a mounting assembly with increased stiffness in a specific direction to prevent rigid body modes of the machine, particularly rotational motion along x-axis and y-axis.

I claim:

1. A mounting assembly to support a machine, the mounting assembly comprising:
   a support frame structure comprising a plurality of traverse members spaced apart from each other, each traverse member extending from a first longitudinal section of the support frame structure to a second longitudinal section of the support frame structure, wherein each of the first longitudinal section and the second longitudinal section comprises a plurality of holes, each hole located between two consecutive traverse members of the plurality of traverse members, and wherein a diameter of each hole of the plurality of holes present on the first longitudinal section is greater than a diameter of each hole of the plurality of holes present on the second longitudinal section; and
   an attachment mechanism to increase stiffness of the support frame structure, the attachment mechanism comprising any or a combination of:
      a plurality of attachments to increase directional stiffness of the support frame structure, wherein each of the plurality of attachments are inserted into respective hole of the plurality of holes present on the first longitudinal section and a pretension is provided to each of the plurality of attachments from a hole of the plurality of holes present on the second longitudinal section; and
      a turnbuckle attachment to increase directional stiffness of the support frame structure, wherein the turnbuckle attachment comprises at least two hinge plates coupled to at least one traverse member of the plurality of traverse members, and a turnbuckle connecting each of the two hinge plates to at least one fixing plate fastened to a vertical section of the machine;
   wherein the attachment mechanism arrests any or a combination of rolling mode of motion and pitching mode of motion of the support frame structure and the machine by increasing the stiffness of the support frame structure.

2. The mounting assembly of claim 1, wherein at least one plate is welded to an inner side of each of the first longitudinal section and the second longitudinal section, and a plurality of gussets are welded to an outer side of each of the first longitudinal section and the second longitudinal section to compensate for buckling of a portion of the first longitudinal section and the second longitudinal section.

3. The mounting assembly of claim 2, wherein each of the first longitudinal section and the second longitudinal section comprises a plurality of threaded holes extending from the outer side of each of the first longitudinal section and the second longitudinal section, and wherein the attachment mechanism comprises at least one additional plate fastened with each of the first longitudinal section and the second longitudinal section through the plurality of threaded holes to increase bending stiffness of the support frame structure.

4. The mounting assembly of claim 1, wherein each of the plurality of attachments comprises a circular plate coupled with an end of a hollow cylindrical section, and wherein the pretension is provided at other end of the hollow cylindrical section by a fastener comprising a stud coupled with a matching nut and a washer.

5. The mounting assembly of claim 4, wherein torsional stiffness of the hollow cylindrical section is equal to torsional stiffness of the plurality of traverse members.

6. The mounting assembly of claim 4, wherein a plurality of steel shims are inserted in between the circular plate and the outer side of the first longitudinal section to ensure contact of the circular plate with the outer side of the first longitudinal section.

7. The mounting assembly of claim 1, wherein the at least one fixing plate fastened to the vertical section of the machine is positioned at a height ranging from 0.5 times to 0.7 times height of the machine.

8. The mounting assembly of claim 1, wherein the at least two hinge plates and the at least one fixing plate incorporate a hinge mechanism respectively to impart a specific degree of freedom to the turnbuckle.

9. The mounting assembly of claim 1, wherein the turnbuckle attachment is configured to provide stability and support to an overhung component of the machine.

* * * * *